July 31, 1928.
G. W. DUNHAM
1,678,638
CLUTCH
Filed Nov. 14, 1924
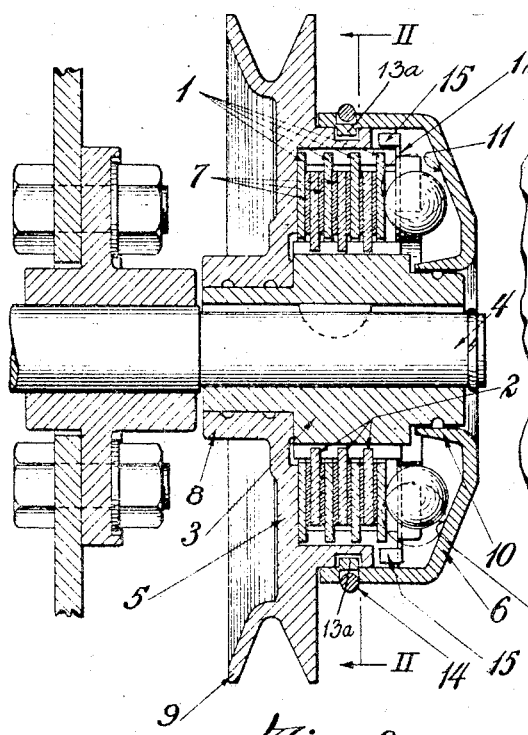
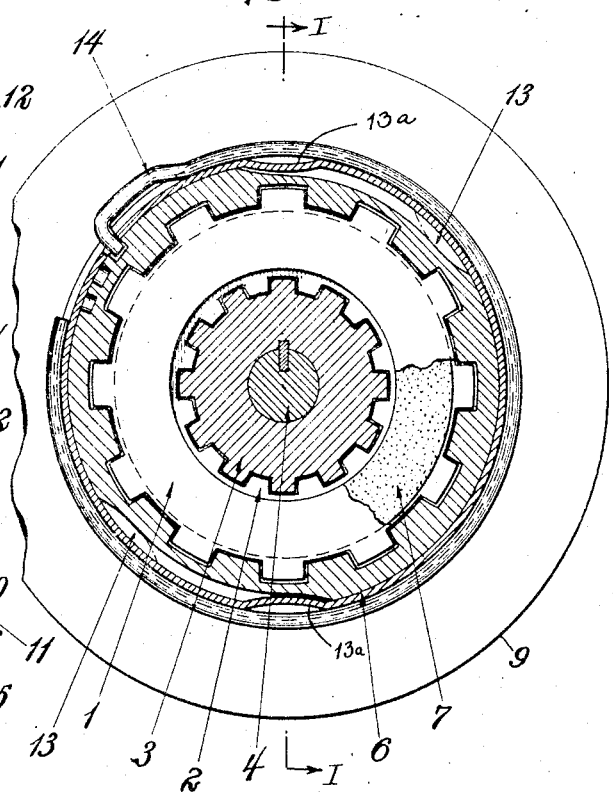
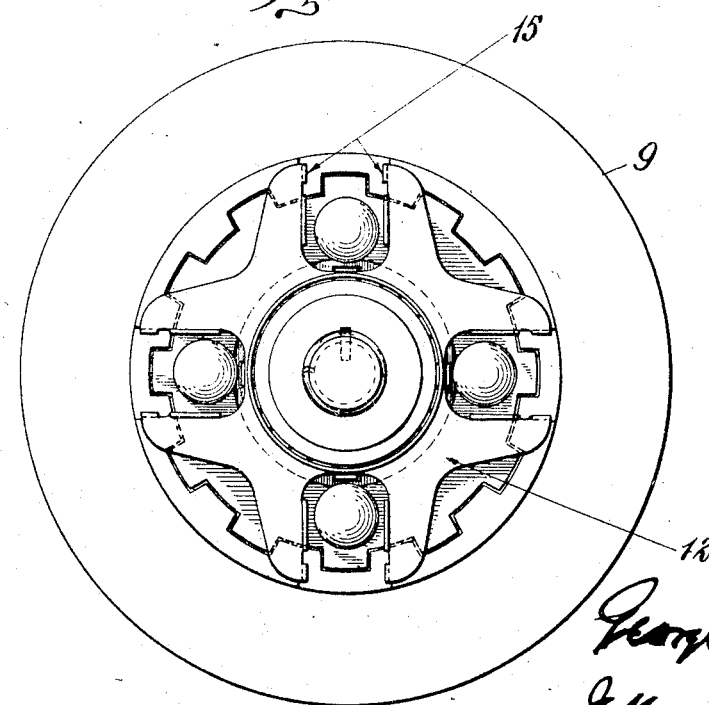
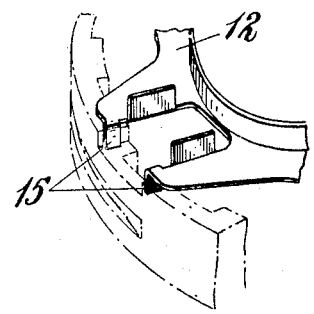
INVENTOR
George W. Dunham
BY
Jeffrey Kimball & Eggleston
ATTORNEY Patented July 31, 1928.

1,678,638

UNITED STATES PATENT OFFICE.

GEORGE W. DUNHAM, OF UTICA, NEW YORK, ASSIGNOR TO SAVAGE ARMS CORPORATION, OF UTICA, NEW YORK, A CORPORATION OF DELAWARE.

CLUTCH.

Application filed November 14, 1924. Serial No. 749,869.

The invention relates to automatic clutches suitable for use in the drive connection between split phase motors and the apparatus driven by them, particularly such apparatus as clothes-washing machines and other domestic appliances. For such uses, the purpose is to permit the motor to pick up its load gradually so that it can come up to speed and cut out its starting winding before the full load is imposed, and also to guard against injury to the motor in case of overload, in the event the driven apparatus becomes jammed or broken. In such cases the purpose of the clutch is to slip and thereby prevent the motor from running at a speed so low as to be likely to damage it. According to the principles of this invention such a clutch can be produced in very compact form, capable of application in different ways to different machinery, of very low manufacturing cost, and possessing the maximum degree of reliability in operation.

In the accompanying drawing, Fig. 1 is an axial section through the new clutch in the form at present preferred, and will suffice to illustrate the principles of the invention, which can be embodied in various other forms, as will presently appear.

Fig. 2 a cross section thereof on line II—II of Fig. 1.

Fig. 3 an end elevation with cover removed, and

Fig. 4 a detail of the ball spacer.

This clutch comprises two sets of interregistering annular steel clutch discs marked 1 and 2 respectively and contained in the space between the inner clutch member 3, which is formed as a hub to be keyed or fixed upon a shaft 4 or other rotatable member, and an outer clutch member 5 which, with its cover 6, forms a housing surrounding and enclosing the hub and discs and the operating means of the latter, thereby constituting the device a self-contained unit, with no exterior operating parts, and adapted to be conveniently applied to existing machinery. The hub constitutes one main clutch member and the housing the other, and within this invention either may be the driving member. The set of discs marked 1 is splined, by multiple splined-grooves, to the cylindrical part or barrel of the outer clutch member 5, so that they may move axially thereon but must rotate therewith. The other set 2, is similarly splined to the hub or other clutch member 3. Suitable friction material is placed between the discs being either secured to them or interposed as washers 7 between them, preferably the latter.

The clutch member 5, which is a one-piece casting or forging, is formed with a journal sleeve 8 at one end or side, by which it is rotatably engaged with or mounted on the end of the hub member 3, and it is exteriorly provided with a wheel element 9, preferably cast integral thereon. In the present case, this wheel element is a simple sheave groove adapted to accommodate a belt. The barrel part of the clutch member 5 is cylindrical in form to receive the clutch discs and is closed by the cover 6. This cover is a simple steel stamping fitted to the barrel part by being telescoped over it and it is preferably punched with a center opening to expose the adjacent end of the hub and also inwardly bossed as indicated by 10, to give a support for the cover on the end of the hub. The punched opening is not essential but is desirable because both ends of the hub are thereby exposed so that it can be placed either end on its shaft 4, or if desired, can be located intermediate the ends of its shaft. The boss 10 is available for abutment upon the adjacent shoulder of the hub to prevent undue axial movement of the hub and housing relatively to each other. In any case the clutch housing is of no greater axial dimension than the hub.

The cover is dished or coned, or otherwise provided with an interior inclined surface 11 for coaction with a set of balls, or equivalent centrifugal means for operating the clutch discs. These balls fly outward under the centrifugal effect, when the driving clutch member is rotated, and by rolling up the inclined surface 11, press the discs together, in proportion to their angular velocity, and thereby produce a more or less positive drive-connection between the two main clutch members, viz, the hub and the housing. The balls in the present case are four in number and are held in equal angular positions by a spider 12, which can be a simple stamping of sheet metal and concentrically mounted on either the cover boss or the hub, according to the direction of power transmission.

Either the hub or the housing may be the driving member of the clutch; preferably it is the housing, as shown in the drawing, in which case the cover is fastened to it as by the bayonet joint construction, indicated by 13. This joint is cheaply produced by casting the bayonet groove in the exterior of the housing 5 and indenting a portion 13ª of the cover to fit such groove. Two indents and grooves are shown. The bayonet joint is locked against unfastening by the inbent end of a wire snap ring 14, which removably seats in a groove, formed on the exterior of the cover deep enough to hold it against accidental displacement. In the present case, and as a matter of convenience the end of the ring can be locked into any one of three holes drilled or cast in the housing.

The design of the ball-holding spider will be clear from the drawing; it is supported and anchored by its fingers 15 in four equally spaced recesses in the edge of the barrel part of the clutch housing, by which means it is held substantially concentric to the axis of the device and rotated with the driving housing, or driving set of clutch discs. The balls are held between the outbent cheeks on the spider and rotated therewith, being thus adapted to cause the closing of the clutch discs according to the speed of the housing. If it were preferred that the hub be the driving member, the spider could be similarly connected to the hub, as will be evident.

Claims—

1. A clutch comprising sets of inter-registering driving and driven clutch discs, centrifugal clutch operating means, a pulley member and a cover, a hub member on which said pulley member, discs, clutch operating means and cover are adapted to be assembled manually to form therewith a self contained unit, the pulley member and cover housing the discs and clutch operating means.

2. A clutch comprising a pulley having an annularly recessed cylindrical boss having a bayonet groove, a hub member, sets of inter-registering driving and driven discs in the recess in said boss, splined respectively to said pulley and hub member, and a manually releasable cover-stamping telescopically related to the recessed boss of the pulley and having a lug adapted to cooperate with the bayonet groove in the boss.

3. A clutch comprising a hub member, a pulley rotatable relative thereto and having therein an annular recess surrounding the hub member, sets of inter-registering driving and driven discs located in said annular recess, a manually releasable cover-stamping telescopically related to the recessed portion of the pulley and removably secured thereto by a bayonet joint comprising an indented portion of the cover-stamping, and centrifugal means housed by the pulley and cover-stamping for automatically operating the clutch discs.

4. A clutch comprising sets of inter-registering driving and driven discs, centrifugal means for pressing them together, a hub member splined to one set and a housing body splined to the other, a cover-stamping enclosing the discs and said centrifugal means, said cover-stamping having an indented portion forming part of a bayonet joint connection to said body, and a locking means for said connection.

5. In a clutch, a ball spacer stamping having a series of ball receiving spaces flanked by sets of reversely bent lugs constituting respectively ball spacer anchoring means and ball restraining and guiding means.

6. A clutch comprising sets of inter-registering driving and driven clutch discs, a hub member splined to one set, a housing splined to the other comprising a housing body and a cover-stamping, centrifugal balls within the housing for pressing the discs together, and a ball spacer stamping rotated by the driving member of the clutch and carrying the balls.

7. A clutch comprising a hub member, a pulley having an annular recess surrounding the hub member, sets of inter-registering driving and driven clutch discs respectively splined to said hub member and pulley, one of which is a driving and the other a driven member, a ball spacer stamping having ball receiving spaces flanked by ball restraining and guiding lugs and by ball spacer anchoring lugs, the latter cooperating with the driving member, centrifugal balls located in the ball spaces for coaction with the clutch discs, and a dished cover-stamping removably secured to the pulley and providing an internal annular inclined end wall for coaction with the balls forming with the adjacent disc an outwardly narrowing wedge-shaped space.

8. A clutch devoid of external operating parts and constituting a self-contained clutch unit for application to and removal from a shaft as such comprising sets of inter-registering driving and driven clutch discs, a hub member splined to one set, a pulley member and cover constituting a separable housing splined to the other set, and loose centrifugal balls within the housing rotated with the driving set for pressing the discs together to apply the clutch.

9. A clutch devoid of external operating parts and constituting a self-contained clutch unit for application to and removal from a shaft as such comprising sets of inter-registering driving and driven clutch discs, a hub member splined to one set, a two part separable housing for said discs splined to the other set, spring means for releasably locking together the parts of said housing, and centrifugal means rotated with the driving set for pressing the discs together to apply the clutch.

10. A clutch constituting a self-contained clutch unit devoid of external operating parts and adapted for application to and removable from a shaft as a unit comprising a pulley having a recessed boss, a hub member having a part located in said recess and reducing it to an annular chamber surrounding said part and open at the end remote from the pulley, sets of inter-registering driving and driven clutch discs adapted to be assembled manually in said annular chamber through its open end, one set being splined to the pulley and the other to the hub, a dished cover-stamping closing the end of said recess and removably secured to the pulley for rotation therewith, and centrifugal clutch-operating means housed by the cover and pulley.

11. A clutch comprising a hub member having a reduced portion at one end and adjacent the same a shoulder, a pulley rotatably mounted adjacent the other end of the hub member, and a dished cover-stamping having its bottom inclined outwardly and toward the pulley and having an inturned boss receiving said reduced portion and terminating opposite and adjacent said shoulder thus preventing undue axial movement toward the other end of the hub member, and clutch members housed by said pulley and cover-stamping and including loose centrifugal members adapted to react with the inclined bottom to apply the clutch.

12. A clutch comprising a hub member having a reduced portion at each end and adjacent the same a shoulder, a pulley rotatably mounted on one of said reduced portions and a dished cover-stamping having a wall extending lengthwise of the hub opposite its unreduced portion and telescoping with and releasably locked to the pulley, said cover-stamping having also an inturned boss receiving the other reduced portion and terminating opposite and adjacent the other shoulder, and clutch elements housed by said pulley and cover-stamping.

13. In a clutch, a sheet metal ball spacer stamping having a series of ball receiving spaces each flanked by a pair of lugs extending from one side of the ball spacer transversely to its plane, and by a second pair of lugs extending from the other side of the ball spacer transversely to its plane and constituting respectively means for restraining and guiding the balls and ball spacer anchoring means.

14. In a clutch, a ball spacer stamping having ball spacer anchoring means and a series of ball receiving spaces having ball guiding means associated therewith.

In testimony whereof, I have signed this specification.

GEORGE W. DUNHAM.